United States Patent [19]

Shockey et al.

[11] Patent Number: 5,470,207
[45] Date of Patent: Nov. 28, 1995

[54] APPARATUS AND METHOD FOR PROVIDING UNIVERSAL AUTOMATIVE AIR CONDITIONING COMPRESSOR

[75] Inventors: Roy L. Shockey, Roanoke; William W. McCulley, Keller, both of Tex.

[73] Assignee: L & S Bearing Co., Oklahoma City, Okla.

[21] Appl. No.: 258,897

[22] Filed: Jun. 10, 1994

Related U.S. Application Data

[63] Continuation of Ser. No. 97,211, Jul. 26, 1993, abandoned.

[51] Int. Cl.$^6$ .................................................. F04B 39/12
[52] U.S. Cl. ........................... 417/313; 417/360; 417/53; 415/213.1; 248/603
[58] Field of Search ..................................... 417/313, 360, 417/359, 362, 364, 53; 248/603, 605, 614, 55; 415/213.1; 418/39

[56] References Cited

U.S. PATENT DOCUMENTS

| | | | |
|---|---|---|---|
| 1,566,963 | 12/1925 | Hargrove | 417/360 |
| 3,053,490 | 9/1962 | Weeks | 417/362 |
| 4,161,667 | 7/1979 | Buckman et al. | 417/360 |
| 4,572,472 | 2/1986 | Eder | 248/603 |
| 4,600,367 | 7/1986 | Terauchi et al. | 417/360 |
| 4,805,868 | 2/1989 | Claude | 248/603 |
| 5,165,867 | 11/1992 | Dockery | 417/360 |

OTHER PUBLICATIONS

Pp. 25–49, Factory Air 1991 Climate Control Parts catalog.

*Primary Examiner*—Richard A. Bertsch
*Assistant Examiner*—Roland G. McAndrews, Jr.
*Attorney, Agent, or Firm*—Mary M. Lee

[57] ABSTRACT

A universal automotive air conditioning compressor assembly with interchangeable mounting rings and suction and discharge manifolds. The compressor includes a universal casing body which will substitute for a large variety of original equipment compressors. The casing has grooves which removably receive interchangeable mounting rings. Various configurations of mounting rings are provided to match original equipment specifications for a wide variety of vehicle makes. The assembly also may include suction and discharge manifolds which are also interchangeable and which adapt the universal compressor unit to the particular suction and discharge hoses, eg., V-style or pad-style, in the original air conditioning system. Thus, by selecting the appropriate mounting rings and manifold style, a universal compressor is adapted for installation in a specific make and model of automotive air conditioning system.

41 Claims, 3 Drawing Sheets

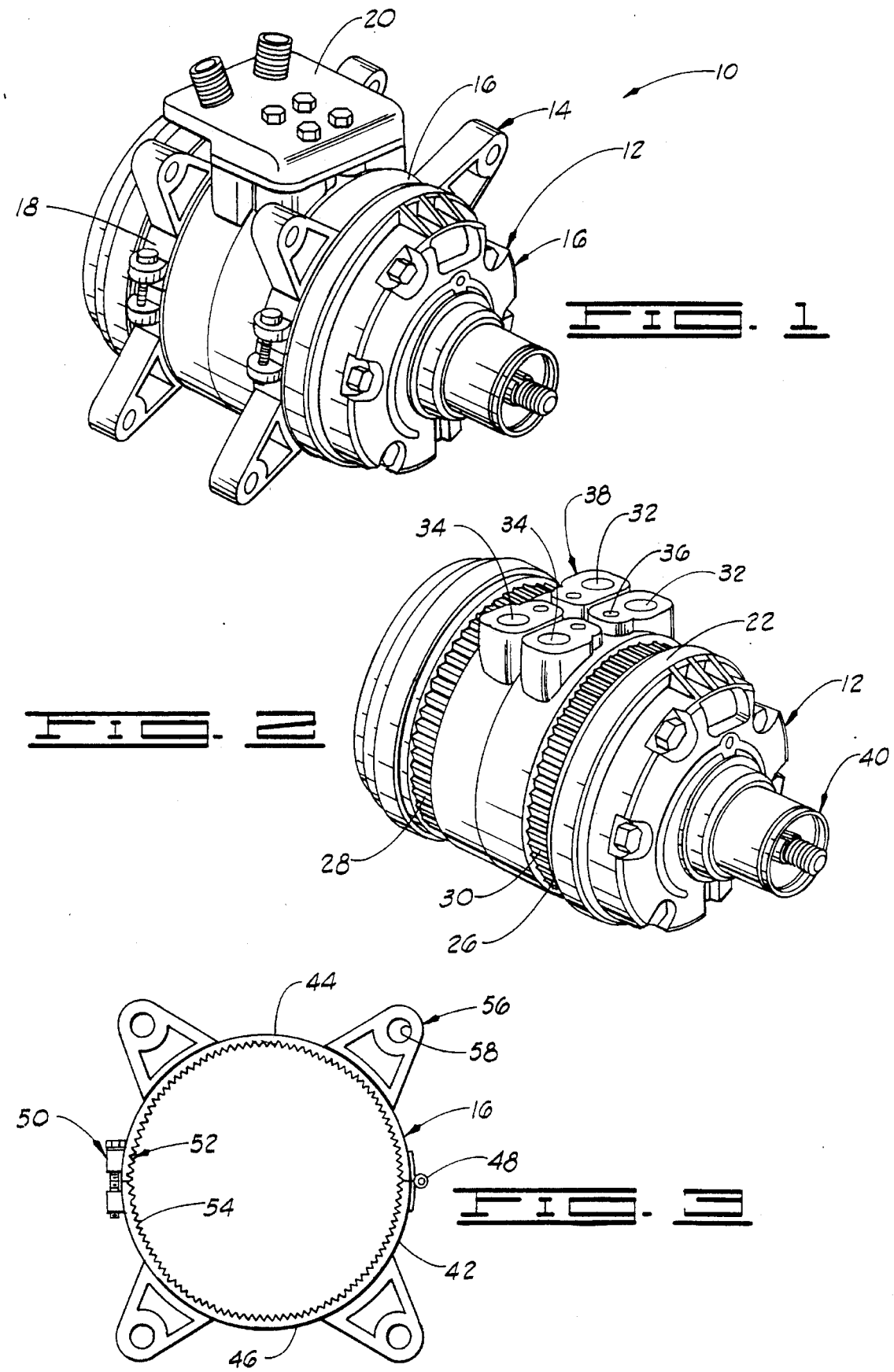

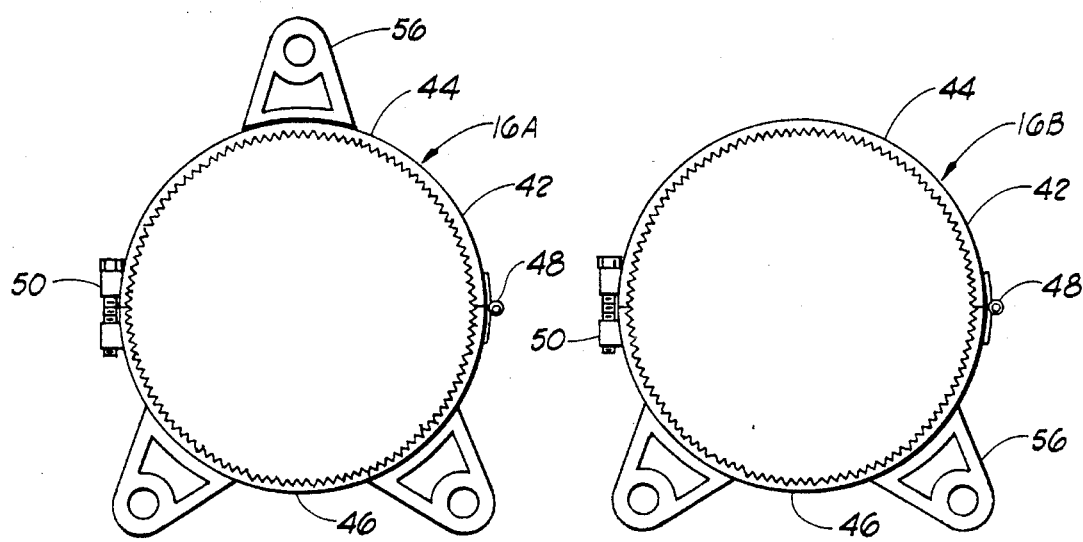
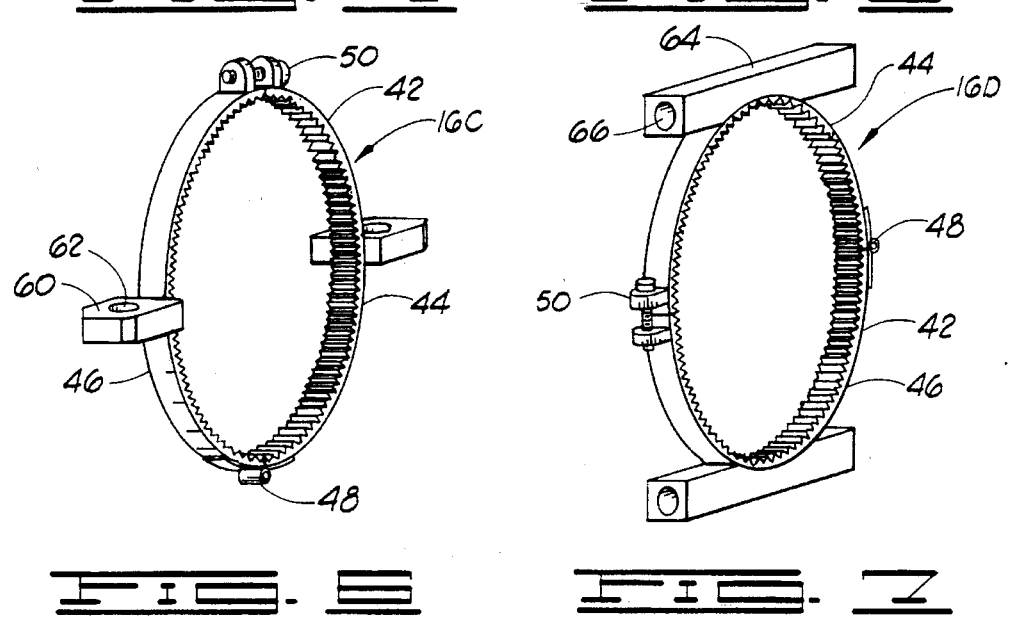
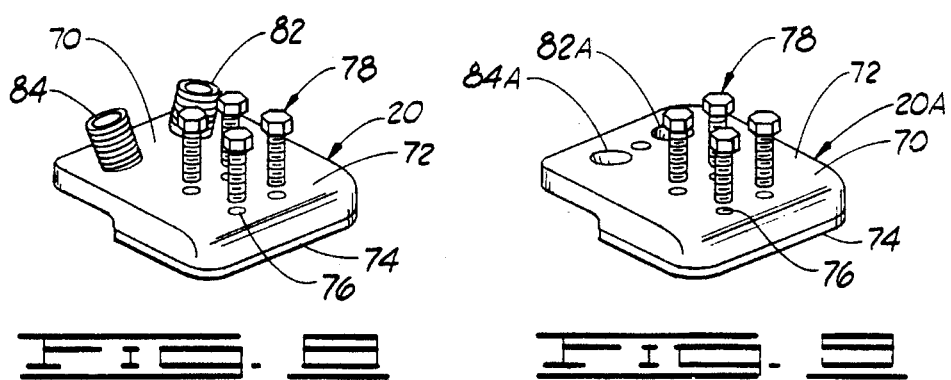

APPARATUS AND METHOD FOR PROVIDING UNIVERSAL AUTOMATIVE AIR CONDITIONING COMPRESSOR

This is a continuation of application Ser. No. 08/097,211, filed Jul. 26, 1993, now abandoned.

FIELD OF THE INVENTION

The present invention relates generally to compressors for automotive air conditioning systems and to devices for mounting such compressors.

BRIEF DESCRIPTION OF THE DRAWINGS

FIG. 1 is a perspective view of a compressor apparatus in accordance with the present invention.

FIG. 2 is a perspective view of a compressor casing apart from the other components of the assembly.

FIG. 3 is an elevational view of a four-eared mounting ring in accordance with one embodiment of the invention.

FIG. 4 is an elevational view of a three-eared mounting ring in accordance with another embodiment of the invention.

FIG. 5 is an elevational view of a two-eared mounting ring in accordance with another embodiment of the invention.

FIG. 6 is a perspective view of another embodiment of the mounting ring of the invention with two ears having transverse bolt holes.

FIG. 7 is a perspective view of another embodiment of the mounting ring of the invention with two transverse tubes for receiving transverse through bolts.

FIG. 8 is a perspective view of a manifold for the compressor apparatus of this invention having "V-style" suction and discharge ports.

FIG. 9 is a perspective view of a manifold for the compressor apparatus of this invention having "pad-style" suction and discharge ports.

DETAILED DESCRIPTION OF THE PREFERRED EMBODIMENTS

Figure 10:
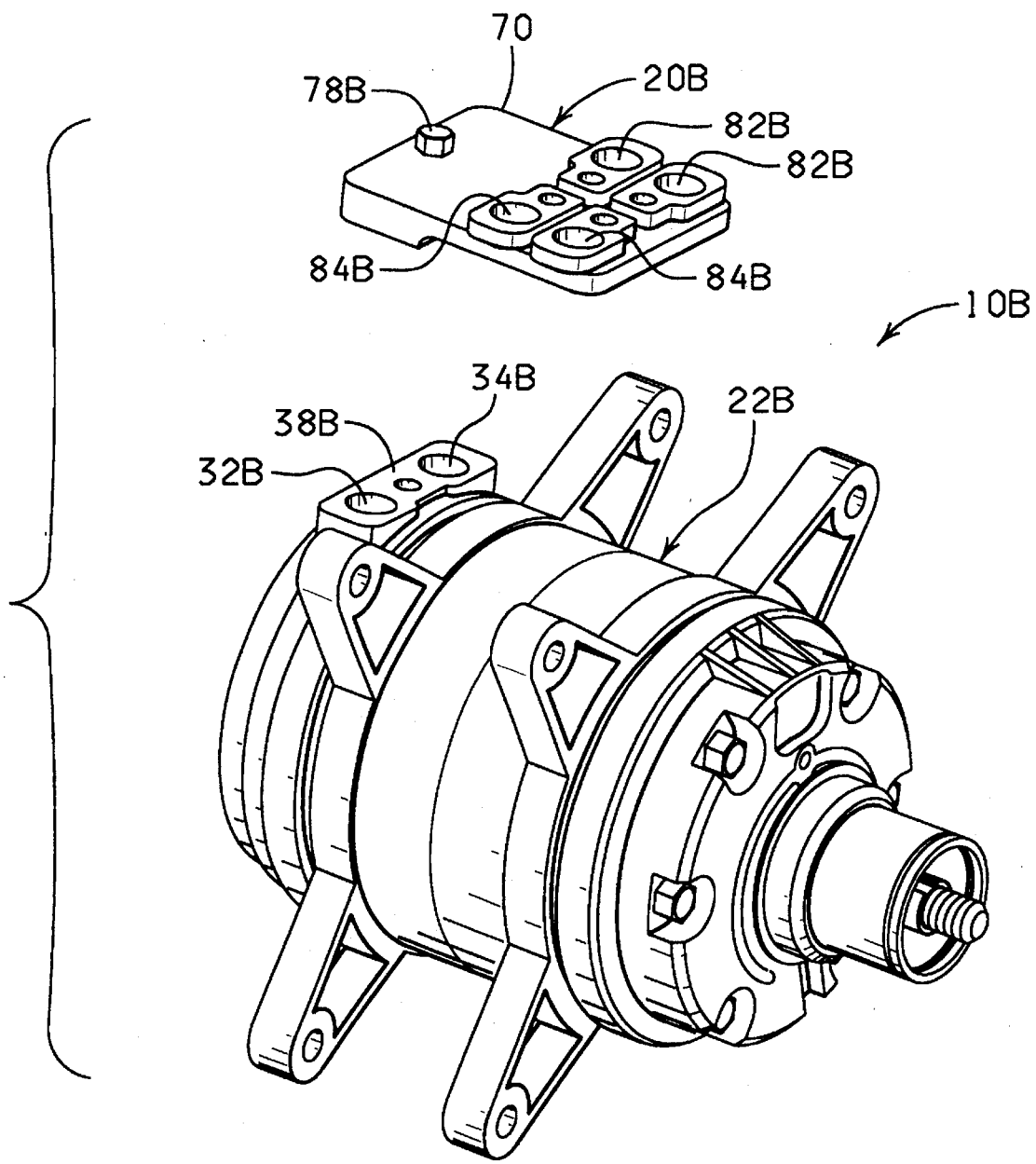
FIG. 10 is a perspective view of a manifold for the compressor apparatus of this invention having two suction and two discharge ports.

Virtually every air conditioning system for automobiles includes a compressor. Although the operation of the various compressor models in automotive air conditioners is similar, the size and capacity of compressors, as well as the mounting and fluid connection configurations, vary widely. For example, the style of fittings for the suction and discharge ports may be a "V" style or a "pad" style. The casing may be formed with different numbers of ears to mount the casing in the automobile. The ears have bolt holes which may be parallel to the longitudinal axis of the casing or transverse. Or, the casing may be mounted by means of transverse tubes which receive long through bolts.

When an automotive air conditioning compressor must be replaced, it can be replaced only with the suitable size and model. As a result, retailers in the field of automotive parts must maintain an inventory of several hundred compressor models. This involves a large financial investment to purchase the inventory and a large expense for storage of the units until sale. Alternately, the units must be special ordered, resulting in a significant delay for the customer.

These and other problems are greatly reduced by the present invention.

The present invention is directed to a replacement compressor apparatus for automotive air conditioning compressors. The apparatus includes a basic compressor unit provided in various sizes. The apparatus further includes a variety of removable mounting rings with different configurations. Thus, by identifying the requirements of a particular automobile's air conditioning system, a replacement compressor can be assembled by combining a basic compressor unit of the correct size with mounting rings having the correct configuration. Using this system, the automotive parts dealer can greatly reduce the number of compressor models maintained in inventory. This decreases the costs to the dealer of purchasing and storing the larger number of compressors and yet does not delay the repair to the customer.

With reference now to the drawings in general and to FIG. 1 in particular there is shown therein a compressor apparatus constructed in accordance with the present invention and designated generally by the reference numeral 10. The apparatus 10 comprises a basic compressor unit 12 and a mounting apparatus 14 usually including a pair of mounting rings 16 and 18. The assembly 10 may also include a manifold 20. Each of these components will be described in more detail hereafter.

Turning now to FIG. 2, the basic compressor unit 12 comprises a casing 22 which houses the compressor mechanism. The mechanism is conventional and may be any one of several sizes. One such size is 6 inches in diameter and 9 inches in length with 10 cubic inches of operating capacity. The shape and size of the casing 22 will be selected to contain as many different sizes of compressors as possible and to fit in as many automotive air conditioning systems as possible. Accordingly, it will be appreciated that the generally cylindrical shape shown in the drawings is exemplary only. It is necessary only that the casing and the compressor mechanism it contains be compatible with the original compressor unit it is intended to replace.

The casing 22 is adapted to be supported by the removable mounting assembly 14 which, as indicated, may include a pair of mounting rings 16 and 18. To this end, the preferred casing 22 includes at least one and preferably two circumferential grooves 26 and 28 positioned near each end of the casing 22. As the grooves are similar, only one will be described herein.

The groove 26 has a width and depth sufficient to contain the mounting ring 16. The groove 26 preferably is equipped with notches 30 for a purpose described hereafter.

The casing 22 further includes suction ports 32 and discharge ports 34 which may be located centrally between the grooves 26 and 28. As shown in FIG. 2, there may be a pair of suction ports 32 and a pair of discharge ports 34. Through the use of an interchangeable manifold, described hereafter, this permits the casing 22 to substitute for compressors having either single or double suction and discharge ports.

Adjacent the suction and discharge ports 32 and 34, a plurality of bolt holes 36 are provided for attachment of an adaptor or manifold described hereafter. The ports 32 and 34 and the bolt holes 36 all may be provided in a raised platform 38 to mate with the manifold 20, as described below.

Of course, the basic compressor unit 12 includes a fitting 40 for attaching the compressor mechanism to the clutch and pulley system which drives the unit.

Returning briefly to FIG. 1, the compressor apparatus 10 of this invention includes a mounting assembly 14 which is removably attached to the casing 22 and by which the apparatus is mounted in the selected automotive air conditioning system. In the preferred embodiment described herein, the mounting assembly 14 includes at least one and preferably two mounting rings 16 and 18. Where two mounting rings are employed, they may be similar as shown in FIG. 1, or they may be different, depending on the configuration of the mounting means in the original system.

The four-eared configuration is depicted in FIG. 3, to which attention now is directed. The mounting ring 16 includes a ring-shaped collar 42 which is composed of first and second semi-circular portions 44 and 46. At one side, the ends of the portions 44 and 46 are attached to each other by a hinge 48. At the other ends, the portions 44 and 46 are adapted to be removably connected, such as by the bracket and screw assembly 50. In this way, the collar 42 can be attached to and removed from the casing 22 as necessary.

The inner surface 52 is provided with notches 54 shaped to engage the notches 30 in the grooves 26 and 28. (See FIG. 2.) The interengaging notches 30 and 54 prevent rotation of the collar 42 around the casing 22 when the collar is received and secured in the groove 26, as shown in FIG. 1.

The mounting ring 16 is provided with at least one and preferably a plurality of connecting members such as the ears 56 shown in the embodiment of FIG. 3. The ear 56 defines a bolt hole 58 which in this embodiment is parallel to the longitudinal axis of the casing 22 and is sized to receive the original bolt (not shown) in the mounting means of the selected air conditioning system. (See FIG. 1.) This configuration of connecting members is referred to herein as a "lateral ear."

Another mounting ring 16A is shown in FIG. 4. The mounting ring 16A of this embodiment has three lateral ears 56.

Another mounting ring 16B is shown in FIG. 5. The mounting ring 16B has two lateral ears 56.

Another mounting ring 16C is shown in FIG. 6. The mounting ring 16C has a pair of "side tubs" 60 which are ears with bolt holes 62 that are transverse to the longitudinal axis of the casing 12. This style of ear is referred to herein as a "transverse ear."

Another mounting ring 16D is shown in FIG. 7. The mounting ring 16D has a pair of transverse tubes 64 providing bolt holes 66 that are transverse to the longitudinal axis of the casing 22. This style of connecting member is referred to herein as a "transverse tube."

Each of the rings 16, 16A, 16B, 16C and 16D (FIGS. 3–7, respectively) may be similarly formed with a collar 42 composed of the first and second portions 44 and 46 connected by the hinge 48 and the bracket and screw device 50.

The type of connecting members and placement of the connecting members on the collar 42 are determined by the configuration of the connecting members on the compressor that is being replaced. That is, the assembly 10 is to be positioned to engage or mate with the corresponding connecting members in the selected automotive air conditioning system which the assembly is intended to replace.

For example, when a pair of four-eared mounting rings 16 and 18 are used on the compressor casing 22, as shown in FIG. 1, the assembly 10 will substitute for a Sankyo brand compressor, model no. SD508, which is found in certain AMC and Jeep vehicles. A basic compressor unit equipped with one three-eared ring 16A (FIG. 4) in place of the ring 16, and one two-eared ring 16B (FIG. 5) in place of the ring 18, will substitute for a Nippondenso brand compressor, model no. 6E171, for a 1980 Ford and for certain Mazdas and Toyotas. A basic compressor unit equipped with two mounting rings 16 with transverse ears 60 (FIG. 6) will replace a C-171-A590 compressor in a 1985–88 Chrysler vehicle. A basic compressor unit with mounting rings 16D having two transverse tubes 64 will replace a Nippondenso brand compressor, model no. 6E171A, which is found in 1980–81 Toyota brand automobiles.

Turning now to FIG. 8, the apparatus 10 will in many instances include a manifold such as the manifold 20 also shown in FIG. 1. The manifold 20 has a body 70 having an upper surface 72 and a lower surface 74. The body 70 is provided with holes 76 which are aligned with the holes 36 in the casing 22 so that by means of bolts 78 the manifold 20 can be affixed to the casing 22 when the lower surface 74 of the manifold is mated with the platform 38 on the casing.

The upper surface 72 is equipped with fittings, such as the V-style fittings 82 and 84 by which the suction and discharge ports 32 and 34 are connected to the suction and discharge hoses (not shown) in the selected air conditioning system. Sealing members, such as O-rings and gaskets (not shown), are included as necessary.

An alternate embodiment for the manifold of the present invention is illustrated in FIG. 9. This manifold 20A adapts the basic compressor unit 12 to pad-type suction and discharge fittings. The manifold 20A is similarly formed with a body 70 having an upper surface 72 and a lower surface 74. The lower surface 74 is adapted to interface with the platforms on the compressor casing 22. Bolt holes 76 and bolts 78 are included for connecting the manifold 20A to the casing 22. Suction and discharge fittings 82A and 84A which are flush with surface 72 are included to provide a "pad-style" fitting configuration.

A different casing and manifold combination is illustrated in FIG. 10, to which attention now is directed. Here, the assembly 10B includes a compressor casing 22B. The casing 22B is provided with top rear pad type suction and discharge ports 32B and 34B in the platform 38B. This assembly 10B further includes a manifold 20B attachable to the platform 38B by a bolt 78B. The manifold 20B is configured with dual suction and discharge fittings 82B and 84B. The manifold 20B is shaped so that, when the manifold is attached to the platform 38B, the suction and discharge fittings 82B and 84B are positioned centrally. Thus, the single-port, rear pad style fluid connection configuration on the casing 22B is converted to a dual-port central pad style configuration by the manifold 20B.

The manifold configuration is selected according to the fittings employed in the original compressor unit in the selected automotive air conditioning system. For example, the V-type manifold 20 (FIGS. 1 and 8) will be utilized for the Sankyo compressor, model no. SD-508, in a 1982 Mazda, which has V-type fittings. On the other hand, the pad-type manifold 20A (FIG. 9) will substitute for the same model casing but with pad fittings as found in 1981–84 Mazdas, for example.

Now it will be appreciated that the present invention provides a basic compressor unit adapted to be supported by a wide variety of interchangeable mounting rings and to be used with different and interchangeable manifolds. In this way, only a few basic models of compressor units can be modified to substitute for a wide variety of integrally formed original compressor units having hundreds of different combinations of mounting configurations and suction and discharge port arrangements. The particular mounting rings and suction and discharge manifolds illustrated and described herein are exemplary and are not intended to limit the invention in any way.

Changes may be made in the combination and arrangement of the various parts, elements, steps and procedures described herein without departing from the spirit and scope of the invention as defined in the following claims.

What is claimed is:

1. A compressor apparatus for an automotive air conditioning system which comprises brackets in an engine compartment for supporting a compressor, the compressor apparatus comprising:

a casing containing a compressor compatible with the air conditioning system, wherein the casing has a first circumferential groove thereon;

a mounting assembly comprising a plurality of connecting members supported on at least a first collar, wherein the first collar is receivable in the first groove on the casing, and wherein the connecting members are adapted to connect the compressor apparatus to the brackets in the engine compartment of the automobile.

2. The compressor apparatus of claim 1 wherein the first collar comprises a ring composed of a first semi-circular portion and a second semi-circular portion, wherein the first semi-circular portion has first and second ends, wherein the second semi-circular portion has first and second ends, wherein the first ends of the first and second portion of the first collar are hingedly attached to each other, wherein the second ends of the first and second portion are adapted to be removably connected, whereby when the second ends of the first collar are disconnected, the first collar can be opened no attach the first collar to the casing or to remove the casing, and so that when the second ends are connected the first collar is secured to the casing.

3. The compressor apparatus of claim 1 wherein the casing includes suction and discharge ports, and wherein the compressor apparatus further includes a manifold removably secured to the casing over the suction and discharge ports, and wherein the manifold is adapted to connect the suction port on the casing to the suction hose of the air conditioning system and to connect the discharge port on the casing with the discharge hose of the air conditioning system.

4. The compressor apparatus of claim 1 wherein the casing is generally cylindrical in shape.

5. The compressor apparatus of claim 4 wherein the first groove and the first collar have interengaging notches, so that when the first collar is received in the first groove, rotation of the first collar around the casing is prevented.

6. The compressor apparatus of claim 1 wherein the casing has a second circumferential groove thereon, and wherein the mounting assembly further comprises a second collar having at least one of the plurality of connecting members thereon, the second collar being adapted to be received in the second groove on the casing.

7. The apparatus assembly of claim 6 wherein the casing has a longitudinal axis and wherein each of the connecting members is a tube for receiving a through bolt, each tube being positioned transverse to the longitudinal axis of the casing.

8. The compressor apparatus of claim 6 wherein the casing includes suction and discharge ports, and wherein the compressor apparatus further includes a selected manifold removably secured to the casing over the suction and discharge ports, and wherein the manifold is adapted to connect the suction port on the casing to the suction hose of the air conditioning system and to connect the discharge port on the casing with the discharge hose of the air conditioning system.

9. The compressor apparatus of claim 6 wherein the connecting members are ears.

10. The compressor apparatus of claim 6 wherein the casing has a longitudinal axis and wherein each of the ears defines a bolt hole having an axis which is parallel to the longitudinal axis of the casing.

11. The compressor apparatus of claim 9 wherein the casing has a longitudinal axis and wherein each of the ears defines a bolt hole having an axis which is transverse to the longitudinal axis of the casing.

12. A mounting assembly for removably supporting a compressor casing in an automotive air conditioning system comprising brackets in the engine compartment of the automobile, wherein the compressor casing has at least a first circumferential groove thereon, wherein the mounting assembly comprises a plurality of connecting members on at least a first collar, wherein the first collar is removably receivable in the first groove, and wherein the connecting members are adapted to removably connect to the brackets in the automotive air conditioning system.

13. The mounting assembly of claim 12 wherein the casing is generally cylindrical in shape.

14. The mounting assembly of claim 13 wherein the first groove in the casing is notched and the first collar has interengaging notches, so that when the first collar is received in the first groove, rotation of the first collar around the casing is prevented.

15. The mounting assembly of claim 13 wherein the first collar comprises a ring composed of a first semi-circular portion and a second semi-circular portion, wherein the first semicircular portion has first and second ends, wherein the second semi-circular portion has first and second ends, wherein the first ends of the first and second portion of the first collar are hingedly attached to each other, wherein the second ends of the first and second portion are adapted to be removably connected, whereby when the second ends of the first collar are disconnected, the first collar can be opened to attach the first collar to the casing or to remove the casing, and so that when the second ends are connected the first collar is secured to the casing.

16. The mounting assembly of claim 12 wherein the casing has a second circumferential groove thereon, and wherein the mounting assembly includes a second collar having at least one of the plurality of connecting members thereon, the second collar being adapted to be received in the second groove.

17. The mounting assembly of claim 16 wherein casing has a longitudinal axis and wherein each of the connecting members on the first and second collars is a tube for receiving a through bolt, the tube being positioned transverse to the longitudinal axis of the casing.

18. The mounting assembly of claim 16 wherein the connecting members are ears.

19. The mounting assembly of claim 18 wherein the casing has a longitudinal axis and wherein each of the connecting members defines a bolt hole having an axis which is parallel to the longitudinal axis of the casing.

20. The mounting assembly of claim 18 wherein the casing has a longitudinal axis and wherein each ear defines a bolt hole having an axis which is transverse to the longitudinal axis of the casing.

21. A compressor for an automotive air conditioning system which comprises brackets in an engine compartment for supporting a compressor, the compressor comprising a casing adapted to be supported by a mounting assembly comprising a plurality of connecting members supported on at least a first collar, the connecting members being adapted for connection to the brackets in the air conditioning system, the casing having a first circumferential groove thereon adapted to receive the first collar of the mounting assembly.

22. The compressor assembly of claim 21 wherein the casing includes suction and discharge ports, and wherein the compressor further includes a manifold removably secured to the casing over the suction and discharge ports, and wherein the manifold is adapted to connect the suction port on the casing to the suction hose of the air conditioning system and to connect the discharge port on the casing with the discharge hose of the air conditioning system.

23. The compressor of claim 21 wherein the casing is generally cylindrical in shape.

24. The compressor of claim 23 wherein the casing has a second circumferential groove thereon for receiving a second collar comprised in the mounting assembly.

25. The compressor of claim 21 wherein the first and second collars of the mounting assembly have notches and the first and second grooves on the compressor casing have interengaging notches, so that when the first and second collars are received in the first and second grooves, rotation of the first and second collars around the casing is prevented.

26. The compressor of claim 24 wherein the casing includes suction and discharge ports, and wherein the compressor further includes a manifold removably secured to the casing over the suction and discharge ports, and wherein the manifold is adapted to connect the suction port on the casing to the suction hose of the air conditioning system and to connect the discharge port on the casing with the discharge hose of the air conditioning system.

27. A method for providing compressors for air conditioners in a plurality of automobiles, wherein each of the plurality of automobiles has an engine compartment and a compressor receiving space therein, wherein each of the plurality of automobiles has a different bracket configuration in its engine compartment for supporting a compressor in the compressor receiving space, the method comprising the steps of:

providing a plurality of compressor units, each of the plurality of compressor units comprising a compressor inside a casing, the casing of each of the plurality of compressor units defining at least one discharge port and at least one suction port and also having at least a first circumferential groove thereon;

providing a plurality of mounting assemblies, each such mounting assembly comprising a plurality of connecting members supported on at least a first collar, wherein the first collar of each of the plurality of mounting assemblies is receivable in the first circumferential groove on the casing of each of the plurality of compressor units, and wherein the plurality of connecting members on each of the-mounting assemblies is configured to engage a different bracket configuration in the plurality of automobiles;

selecting one of the plurality of automobiles;

selecting one of the plurality of compressor units;

selecting one of the plurality of mounting assemblies which is compatible with bracket configuration in the selected automobile; and connecting the first collar of the selected mounting assembly to the first groove on the selected compressor unit.

28. The method of claim 27 wherein the selected compressor unit is defined further as having a second circumferential groove on the casing, wherein the selected mounting assembly comprises a second collar supporting at least one of the plurality of connecting members, wherein the second collar is receivable in the second groove, and wherein the method further comprises the steps of:

connecting the second collar of the selected mounting assembly to the second groove on the selected compressor unit.

29. The method of claim 27 wherein the selected compressor unit has a longitudinal axis, wherein each of the connecting members on the selected mounting assembly is a tube for receiving a through bolt, each tube being positioned transverse to the longitudinal axis of the casing.

30. The method of claim 27 wherein the first collar of the selected mounting assembly comprises a ring composed of a first semi-circular portion and a second semi-circular portion, wherein the first semi-circular portion has first and second ends, wherein the second semi-circular portion has first and second ends, wherein the first ends of the first and second portion of the first collar are hingedly attached to each other, wherein the second ends of the first and second portion are adapted to be removably connected, whereby when the second ends of the first collar are disconnected, the first collar can be opened to attach the first collar to the first groove in the casing of the selected compressor unit, or to remove the casing, and so that when the second ends are connected the first collar is secured to the casing of the selected compressor unit.

31. The method of claim 27 wherein the plurality of automobiles includes automobiles having air conditioners which require different sizes of compressors and wherein the plurality of compressor units provided include compressors of different sizes corresponding to the different sizes required in the plurality of automobiles.

32. The method of claim 27 wherein the plurality of automobiles includes automobiles having air conditioners which require compressors having different capacities and wherein the plurality of compressor units provided include compressors of different capacities corresponding to the different capacities required in the plurality of automobiles.

33. The method of claim 27 wherein the casing of each of the plurality of compressor units provided is cylindrical.

34. The method of claim 33 wherein the first groove on the casing of the selected compressor unit and the first collar of the selected mounting assembly have interengaging notches, so that when the first collar is received in the first groove, rotation of the first collar around the casing is prevented.

35. The method of claim 27 wherein the connecting members on at least one of the collars are ears.

36. The method of claim 35 wherein the selected compressor unit has a longitudinal axis, wherein the connecting members on the selected mounting assembly are ears, and wherein each of the ears defines a bolt hole having an axis which is parallel to the longitudinal axis of the selected compressor unit.

37. The method of claim 35 wherein the selected compressor unit has a longitudinal axis, wherein the connecting members on the selected mounting assembly are ears, and wherein each of the ears defines a bolt hole having an axis which is transverse to the longitudinal axis of the selected compressor unit.

38. The method of claim 27 wherein the plurality of automobiles includes automobiles requiring different fluid connection configurations for connecting suction and discharge hoses in the air conditioners therein to compressors therein, wherein the casing of each of the plurality of compressor units has a first suction port and a first discharge port, and wherein the method further comprises the step of:
  providing a plurality of manifolds, each attachable to the casing over the first suction and discharge ports and each compatible with a different fluid connection configuration;
  selecting one of the plurality of manifolds having a fluid connection configuration which is compatible with the fluid connection configuration in the selected automobile; and
  attaching the selected manifold to the casing of the selected compressor unit.

39. The method of claim 38 wherein the different fluid connection configurations include V-type.

40. The method of claim 38 wherein the different fluid connection configurations include pad-type.

41. The method of claim 38 wherein each of the casings of the plurality of compressor units provided includes a second suction port and a second discharge port, wherein each of the plurality of manifolds provided is attachable over the first and second suction and discharge ports, and wherein the plurality of manifolds provided includes manifolds which have single port connections and manifolds which have double port connections.

* * * * *

UNITED STATES PATENT AND TRADEMARK OFFICE
CERTIFICATE OF CORRECTION

PATENT NO. : 5,470,207
DATED : November 28, 1995
INVENTOR(S) : Roy L. Shockey and William W. McCulley It is certified that error appears in the above-identified patent and that said Letters Patent is hereby corrected as shown below:

Title page, in the title of the invention, line 2, delete "AUTOMATIVE" and insert -AUTOMOTIVE- Column 1, line 2, delete "AUTOMATIVE" and insert -AUTOMOTIVE- Column 2, line 23, delete "apparatus" and insert -assembly- Column 2, line 24, delete "assembly" and insert -apparatus- Column 6, claim 12, line 15, delete "the" and insert - an- Column 6, claim 15, line 31, delete "rang" and insert -ring- Column 6, claim 15, line 33, place a hyphen (-) in between "semi" and "circular"

Column 6, claim 17, line 49, between the words "wherein" and "casing" insert -the- Column 7, Claim 27, line 54, delete the hyphen (-) between the words "the" and "mounting"

Signed and Sealed this

Tenth Day of September, 1996

Attest:

BRUCE LEHMAN

*Attesting Officer*     *Commissioner of Patents and Trademarks*